(12) United States Patent
Genoni et al.

(10) Patent No.: US 6,378,563 B2
(45) Date of Patent: Apr. 30, 2002

(54) PLASTIC PIPE WITH STRUCTURE HAVING IMPROVED CRITICAL PRESSURE

(75) Inventors: Massimo Genoni, Sasso Morelli-Imola; Andrea Ticci, Castel Guelfo; Cesare Vannini, Bologna, all of (IT)

(73) Assignee: Nupi S.p.A., Imola (IT)

( * ) Notice: Subject to any disclaimer, the term of this patent is extended or adjusted under 35 U.S.C. 154(b) by 0 days.

(21) Appl. No.: 09/770,398

(22) Filed: Jan. 29, 2001

(30) Foreign Application Priority Data

May 5, 2000 (IT) .......................................... MI00A0986

(51) Int. Cl.$^7$ .................................................. F16L 9/14
(52) U.S. Cl. ........................ 138/137; 138/140; 138/141
(58) Field of Search ................................ 138/137, 140, 138/141

(56) References Cited

U.S. PATENT DOCUMENTS 4,434,976 A * 3/1984 Murakami et al. ........ 138/42 X
4,749,823 A * 6/1988 Ziemek et al. .......... 138/122 X
5,800,886 A * 9/1998 Vallauri et al. ............ 428/35.8

FOREIGN PATENT DOCUMENTS

| EP | 0603935 A1 | 6/1994 |
| EP | 0897935 A2 | 2/1999 |

* cited by examiner

*Primary Examiner*—Patrick Brinson
(74) *Attorney, Agent, or Firm*—Jacobson Holman, PLLC

(57) ABSTRACT

A pipe for fluid transportation is made up of a first layer of material with a first desired critical pressure $PC_1$ and a second layer of material with a critical pressure $PC_2 < 0.4 PC_1$. Thickness of the first layer is between 0.1% and 25% of total pipe thickness but not less than 0.3 mm and preferably 0.5–1 mm). Surprising it is observed that a pipe made in this manner has a critical pressure CP near the first desired critical pressure $PC_1$ despite the low thickness of the first layer.

17 Claims, 1 Drawing Sheet

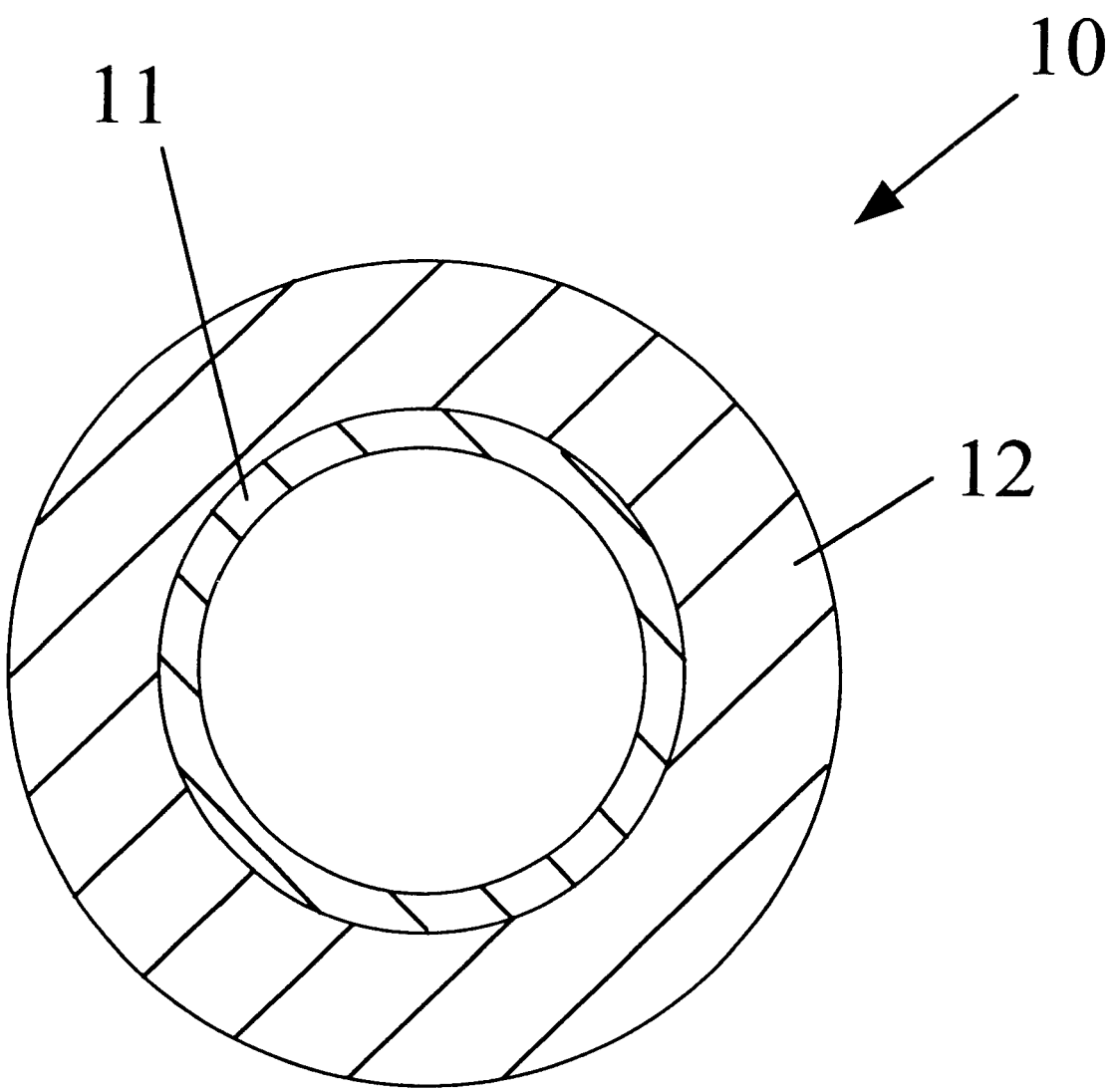

PLASTIC PIPE WITH STRUCTURE HAVING IMPROVED CRITICAL PRESSURE

BACKGROUND OF THE INVENTION

The present invention relates to a plastic pipe having a structure making it much more resistant to the propagation of wall cracks and more generally with good mechanical characteristics and relatively low cost.

In the prior art the problem of rapid crack propagation in pipe under pressure is known. In a plastic pipe under pressure a localized cracking can extend rapidly until it causes destruction of the entire line.

To classify the behavior of plastic pipe as concerns cracks we define a critical pressure (CP) for a given temperature (ISO DIS 13477 and 13478). The higher the critical pressure of a pipe the more resistant it is to rapid crack propagation. This characteristic is added to that of nominal pressure at which the pipe can operate.

Of two pipes having the same thickness and different CP the one with the higher CP is usually made with more costly material. In general, a crosslinked polyethylene pipe has a CP at least 2.9–4 times the CP of a non-crosslinked polyethylene pipe of the same thickness. Unfortunately the crosslinked polyethylene is more costly and suffers from shortcomings like not being weldable by butt fusion.

The general purpose of the present invention is to remedy the above mentioned shortcomings by making available a pipe with high CP and reduced cost.

SUMMARY OF THE INVENTION

In view of this purpose it was sought to provide in accordance with the present invention a pipe for fluid transportation made up of at least a first layer of material with a first desired critical pressure $PC_1$ and at least a second layer of material with a second critical pressure $PC_2<0.4PC_1$ (preferably $PC_2<0.25PC_1$) with the thickness of the first layer between 0.1% and 25% of total pipe thickness but non less than 0.3 mm.

BRIEF DESCRIPTION OF THE DRAWINGS

To better clarify the explanation of the innovative principles of the present invention and its advantages as compared with the prior art a possible embodiment applying said principles is described below by way of example with the aid of the only annexed drawing.

DETAILED DESCRIPTION OF THE INVENTION

With reference to the FIGURE a pipe 10 made in accordance with the present invention is made up of a first internal layer 11 and a second more outward layer 12. The two layers are co-extruded.

The internal layer is made with material having $PC_1$ essentially equal to that desired for the entire pipe. The external layer is made with a material having $PC_2<0.4PC_1$.

The total thickness of the pipe is calculated to have the desired nominal operating pressure (NP) and the thickness of the internal layer is between 0.1% and 25% of total pipe thickness but not less than 0.3 mm and preferably not less than 0.5 mm.

It was surprisingly found that by making a pipe as set forth above the pipe CP is surprisingly near the CP of the internal layer material as though the entire pipe was formed only of the material used for the first layer while the internal layer is in reality much thinner and would not be able to support alone the nominal pressure at which the pipe is to operate.

It was found advantageous to apply the principles of the present invention to the combination of polyethylene (PE) and crosslinked polyethylene (PEX).

The first material is preferably a crosslinked polyethylene having a critical pressure $PC_1$ measured at $-30°$ C. in accordance with ISO DIN standards 13477 (1996) of at least 12 bar. A crosslinked polyethylene obtained by crosslinking a silane-grafted polyethylene and having an MRS classification in accordance with ISO/TR 9080 of 10 (denoted by PEX100) or higher is preferred. Especially preferred is a silane crosslinked polyethylene of this type having an MRS classification of 11.2 (denoted by PEX112) or 12.5 (denoted by PEX125).

The former material has advantageously a slow crack growth propagation resistance (ESCR) in accordance with ISO F/DIS 13479 (1996) of at least 5000 hours measured with a hoop stress of 4.6 MPa at $80°$ C.

Good results were obtained with a silane crosslinked polyethylene having a gel content (insoluble in hot xylene measured in accordance with ISO/DOS 10147) between 65% and 85%.

The silane crosslinked polyethylene is generally obtained by exposition to water or moisture of a silane-grafted polyethylene having a density in accordance with ASTM D792-66 of at least 943 kg/m$^3$. Good results were obtained using a silane-grafted polyethylene having a density of at least 950 kg/m$^3$. The melting index $MI_5$ of silane grafted polyethylene measured by procedure B of ASTM D1238 at a load of 5 kg is generally between 0.05 and 5 g/10 min and preferably between 0.1 and 2 g/10 min. The silane grafted polyethylene contains advantageously between 0.10 and 0.24 of hydrolizable silanic groups for 100 units $CH_2$.

The second material is preferably a polyethylene having critical pressure $PC_2$ measured at $0°$ C. in accordance with ISO standard DIS 13477 (1996) of at least 3 bar. More preferably it is a polyethylene having a critical pressure $PC_2$ measured at $-15°$ C. in accordance with ISO standard DIS 13477 (1996) of at least 2.5 bar.

The second material is generally a polyethylene having an MRS classification in accordance with ISO/TR 9080 classification of 8 (denoted by PE80) or higher. Especially preferred is a polyethylene having MRS classification of 10 (denoted by PE100) or higher.

These polyethylenes are described in detail in European patent applications EP 0 603 935 and EP 0 897 935.

It was found preferable to use PE100 with density preferably >935 kg/m$^3$ and more preferably >940 kg/m$^3$ and preferably <965 kg/m$^3$ and more preferably <960 kg/m$^3$ with melting index $MI_5$ (ASTM D1238—procedure B) preferably <10 g/10 min (and more preferably <7 g/10 min) and preferably >0.07 g/10 min (and more preferably >0.1 g/10 min), HLMI/MI5 ratio (HLMI measured by ASTM D1238—procedure B—with a load of 21.6 kg) preferably >10 (and more preferably >15) and generally <150, and ESCR>2000 h (measured under 4.6 MPa at $80°$ C., on a notched pipe of diameter 110 mm and thickness 10 in accordance with ISO standards F/DIS 13477 (1996). The Applicant found that using a polyethylene having an MRS classification of 10 or more as described above as second layer of material and a silane crosslinked polyethylene having an MRS classification of 10 or higher as described above gives pipes having at least the same pressure resistance as a pure polyethylene MRS 10 pipes of the same thickness and diameter. These pipes in accordance with the present invention also have a substantial increase in resistance to rapid crack propagation.

In addition, when the crosslinked polyethylene is used in the external layer of the pipe an increase in resistance to scratching is obtained. When the crosslinked polyethylene is used in the internal layer of the pipe a substantial increase in point loading resistance is obtained.

EXAMPLE

A 110 mm diameter pipe in accordance with the present invention has been made with an external layer of non-crosslinked polyethylene ($PC_2$=2.9 bar at −15° C.) and an internal layer of crosslinked polyethylene ($PC_1$>12 bar at −15° C.).

Internal layer thickness was be between 0.5 mm and 1.0 mm. The non-crosslinked polyethylene was a polyethylene having an MRS classification of 10 and an $MI_5$ of 0.45 g/10 min of the type marketed by Solvay Polyolefins Europe with the name ELTEX®TUB 121 and the crosslinked polyethylene was obtained by crosslinking a silane grafted polyethylene having an MRS classification of 10, density of 954 kg/m$^3$, $MI_5$ of 1.3 g/10 min and gel content 70–75% of the type marketed by Solvay Polyolefins Europe with the name ELTEX ®TUX 100.

The pipe obtained in this manner had a pressure resistance equal to the pressure resistance of a pipe of the same diameter and overall thickness but made only with the non-crosslinked polyethylene having a MRS 10 classification. The pipe with diameter 110 mm made in this manner has a CP greater than 12 bar at −15° C., i.e. substantially near the CP of a pipe of the same thickness but composed only of crosslinked polyethylene. This result is surprising since by making an internal layer of less than one millimeter in a pipe with total thickness of 8.1 mm the CP of the entire pipe is multiplied by more than four.

Heretofore one skilled in the art believed that the only way to obtain a pipe with predetermined CP and thickness was to use only a material with this predetermined CP. The internal and external diameters of the pipe can be kept equal to those of a pipe made entirely with the material of the internal layer or of the material of the external layer so that the pipe can be kept with standard dimensions and perfectly replacing a pipe made with only the material of the internal layer or with only the material of the external layer.

It is important that the two materials have a similar modulus of elasticity and thermomechanical characteristics. Indeed, it is known that for design purposes (sizing) of a composite piping it is necessary to solve the equation system:

$$\begin{cases} \varepsilon_1 = \varepsilon_2 \\ \sigma_2 S_2 + \sigma_1 S_1 = P\,D/2 \\ \varepsilon_2 = f_2(\sigma_2, t, T) \\ \varepsilon_1 = f_1(\sigma_1, t, T) \end{cases} \quad (1)$$

where $\varepsilon$ is deformation, $\sigma$ is stress, S is thickness, P is pressure, D is piping diameter, t is time, T is temperature and the subscripts 1 and 2 denote the internal and external layers respectively.

The first equation is the congruence equation, the second equilibrium, and the third and fourth represent thermomechanical properties (creep, modulus of elasticity et cetera.

For homogeneous structures the system is virtually reduced to the following equation:

$$SDR = \frac{20\,MRS}{PR\,C_{sys}} + 1 \quad (2)$$

where SDR is the ratio of pipe diameter to pipe thickness, PR is nominal pressure, $C_{sys}$ is the safety coefficient and minimum required strength (MRS) is a magnitude with the dimensions of a stress characterizing the material considered.

The simplification introduced by the hypothesis of wall homogeneity is evident.

By appropriately selecting materials in accordance with one of the principles of the present invention it is possible to use equation (2) for sizing despite the fact that the piping is multi-layer with composite structure. Naturally care is to be taken to use the lesser of the MRSs of the materials as the MRS of the multi-layer piping.

It should be noted that co-extrusion of the material is possible to obtain a very thin internal layer which would be impossible to produce without simultaneous co-extrusion of the external layer. In addition, as those skilled in the art may imagine, during co-extrusion it is possible to obtain crosslinking of the silane grafted polyethylene for such thin layers spontaneously and in shorter times. This avoids the high costs born when it is necessary to carry out the reticulation procedure with greater thicknesses. Pipes made with layers of PEX 100, 112 or 125 and PE 100 or 80 proved to have very high quality.

In accordance with the present invention pipes with improved characteristics (improved CP, improved resistance to point loading and to scratching and improved ESCR et cetera) are obtained while maintaining the good resistance to long term hydrostatic pressure (MRS) and without an increase in wall thickness.

In addition to a considerable reduction in the cost of the pipe it should also be considered that with a layer of considerable thickness made of non-crosslinked polyethylene (advantageously the external layer) it is possible to join the pipes by conventional welding procedures (e.g. with standard polyethylene electrofusion fittings, butt welding, et cetera).

It is now clear that the predetermined purposes have been achieved by making available a pipe which although made mainly with materials with CP lower than that desired for the entire pipe there is surprisingly a total CP of the desired value with a substantial saving in cost while keeping weldability properties.

According to the invention, the material with the higher CP ($PC_1$) can be used at the inside of the pipe or/and at the outside of the pipe.

As mentioned above, again in accordance with the present invention, it was found that the pipe can be made with the thin higher CP layer outside if it is desired to have the lower CP layer material inside while keeping the property of obtaining a pipe with CP substantially near the CP of the thin layer, for example if the fluid conveyed is incompatible with the higher CP material. Depending on the internal or external arrangement of the PEX greater improvements in one or the other of the pipe characteristics will be obtained. For example, with PEX in the internal layer there will be greater improvement of the CP and resistance to point loading while with PEX in the external layer there will be better scratch resistance.

The pipe according to the invention can also have more than two layers. For example, a pipe can be made up of three layers, to wit PEX-PE-PEX. In this case the thickness of each PEX layer would be between 0.1% and 25% of total pipe thickness.

Naturally the above description of an embodiment applying the innovative principles of the present invention is given by way of non-limiting example of said principles and is not to be construed as a limitation of the scope of the exclusive right claimed here.

The surprising results obtained could also be expressed as a function of temperature and not critical pressure. Indeed, it is known that every material shows a drastic reduction of critical pressure at low temperatures (typically below 0° C.). Surprisingly it was found that the critical pressure trend of the multi-layer pipe made in accordance with the present invention as a function of temperature approximates that of the material with higher critical pressure.

What is claimed is:

1. A pipe for fluid transportation made up of at least a first layer of material with a first desired critical pressure $PC_1$ and at least a second layer of material with a second critical pressure $PC_2 < 0.4 PC_1$ with the thickness of the first layer between 0.1% and 25% of total pipe thickness but not less than 0.3 mm.

2. Pipe in accordance with claim 1 wherein $PC_2 < 0.25 PC_1$.

3. Pipe in accordance with claim 1 wherein said first layer is inside said second layer.

4. Pipe in accordance with claim 1 wherein said first layer is of crosslinked polyethylene and said second layer is of non-crosslinked polyethylene.

5. Pipe in accordance with claim 4 wherein the pipe comprises another layer to form an alternation of crosslinked polyethylene (PEX), non-crosslinked polyethylene (PE) and crosslinked polyethylene (PEX).

6. Pipe in accordance with claim 5 wherein the crosslinked polyethylene is chosen from among PEX 100, 112 and 125 and the non-crosslinked polyethylene is chosen between PE 100 and 80.

7. Pipe in accordance with claim 1 wherein the thickness of the first layer is around 0.5–1 mm.

8. Pipe in accordance with claim 1 wherein the non-crosslinked polyethylene layer has a density preferably of >935 kg/m$^3$ and <965 kg/m$^3$.

9. Pipe in accordance with claim 1 wherein the non-crosslinked polyethylene layer has a melting index $MI_5$ (ASTM D1238—procedure B) preferably <10 g/10 min and >0.07 g/10 min.

10. Pipe in accordance with claim 1 wherein the non-crosslinked polyethylene layer has a HLMI/MI5 ratio (HLMI measured by ASTM D1238—procedure B—with a load of 21.6 kg) preferably >10 and generally <150.

11. Pipe in accordance with claim 1 wherein the non-crosslinked polyethylene layer has ESCR>2000 h measured under 4.6 MPa at 80° C. on a notched pipe with diameter 110 mm and thickness 10 in accordance with the ISO standards F/DIS 13477 (1996).

12. Pipe in accordance with claim 4 wherein the crosslinked polyethylene is silane grafted crosslinked polyethylene.

13. Pipe in accordance with claim 12, wherein the crosslinked polyethylene has a gel content between 65% and 85%.

14. Pipe in accordance with claim 12, wherein the silane-grafted polyethylene contains between 0.10 and 0.24 hydrolizable silanic groups per 100 $CH_2$ units.

15. Pipe in accordance with claim 8 wherein the non-crosslinked polyethylene layer has a density more preferably of >940 kg/m$^3$ and <960 kg/m$^3$.

16. Pipe in accordance with claim 9 wherein the non-crosslinked polyethylene layer has a melting index MI5 more preferably <7 g/10 min and >0.1 g/10 min.

17. Pipe in accordance with claim 10 wherein the non-crosslinked polyethylene layer has a HLMI/MI5 ratio more preferably >15 and generally <150.

* * * * *